(12) United States Patent
Wang et al.

(10) Patent No.: US 9,179,445 B2
(45) Date of Patent: Nov. 3, 2015

(54) COMMUNICATION IN THE PRESENCE OF UPLINK-DOWNLINK CONFIGURATION CHANGE

(71) Applicant: RESEARCH IN MOTION LIMITED, Waterloo (CA)

(72) Inventors: Yiping Wang, Allen, TX (US); Andrew Mark Earnshaw, Kanata (CA); Jun Li, Richardson, TX (US); David Nigel Freeman, Basingstoke (GB)

(73) Assignee: BlackBerry Limited, Waterloo, Ontario (CA)

( * ) Notice: Subject to any disclaimer, the term of this patent is extended or adjusted under 35 U.S.C. 154(b) by 185 days.

(21) Appl. No.: 13/855,201

(22) Filed: Apr. 2, 2013

(65) Prior Publication Data
US 2014/0293883 A1    Oct. 2, 2014

(51) Int. Cl.
*H04W 72/04*    (2009.01)
*H04W 72/12*    (2009.01)
*H04L 12/855*    (2013.01)
*H04L 5/00*    (2006.01)

(52) U.S. Cl.
CPC .............. *H04W 72/04* (2013.01); *H04L 5/0055* (2013.01); *H04L 5/0096* (2013.01)

(58) Field of Classification Search
CPC .. H04B 7/2656; H04L 1/1607; H04L 1/1812; H04L 1/1822; H04L 1/1854; H04L 1/1874; H04L 5/0055; H04L 1/1816; H04W 28/04; H04W 72/04; H04W 72/0446; H04W 72/12; H04W 72/1284; H04W 72/1289

USPC ......... 370/252, 254, 236, 280, 329, 336, 350; 714/748
See application file for complete search history.

(56) References Cited

U.S. PATENT DOCUMENTS

| | | | |
|---|---|---|---|
| 8,724,504 B2 * | 5/2014 | Gao et al. ...................... 370/252 |
| 8,798,014 B2 * | 8/2014 | Pan et al. ...................... 370/336 |
| 8,873,519 B2 * | 10/2014 | Park et al. ..................... 370/336 |
| 9,014,065 B2 * | 4/2015 | Yang et al. .................... 370/280 |
| 9,019,871 B2 * | 4/2015 | Yang et al. .................... 370/280 |
| 2008/0080476 A1 * | 4/2008 | Cho et al. ...................... 370/350 |
| 2011/0007674 A1 * | 1/2011 | Dai et al. ....................... 370/282 |
| 2011/0035639 A1 * | 2/2011 | Earnshaw et al. ............. 714/748 |
| 2011/0235554 A1 * | 9/2011 | Chen ............................. 370/279 |
| 2012/0207109 A1 * | 8/2012 | Pajukoski et al. ............. 370/329 |

(Continued)

FOREIGN PATENT DOCUMENTS

| | | |
|---|---|---|
| WO | 2012106840 | 8/2012 |
| WO | 2012113131 | 8/2012 |
| WO | 2012128490 | 9/2012 |

OTHER PUBLICATIONS

European Patent Office, International Search Report and Written Opinion for PCT/US2014/031706 dated Jun. 18, 2014 (14 pages).

(Continued)

*Primary Examiner* — Ahmed Elallam
(74) *Attorney, Agent, or Firm* — Trop Pruner & Hu, P.C.

(57) ABSTRACT

Data is communicated between a network node and a user equipment in a first frame according to a first uplink-downlink configuration. In response to a configuration change that causes a second frame following the first frame to be according to a second, different uplink-downlink configuration, an acknowledgement indication for the data is sent in the second frame.

23 Claims, 11 Drawing Sheets

(56) References Cited

U.S. PATENT DOCUMENTS

| | | | |
|---|---|---|---|
| 2012/0230272 A1* | 9/2012 | Kim et al. | 370/329 |
| 2012/0269179 A1* | 10/2012 | Li et al. | 370/336 |
| 2012/0307689 A1* | 12/2012 | Kim et al. | 370/280 |
| 2013/0028205 A1* | 1/2013 | Damnjanovic et al. | 370/329 |
| 2013/0070652 A1* | 3/2013 | Li et al. | 370/280 |
| 2013/0155915 A1* | 6/2013 | Park et al. | 370/280 |
| 2013/0188532 A1* | 7/2013 | Zhang et al. | 370/280 |
| 2013/0194980 A1* | 8/2013 | Yin et al. | 370/280 |
| 2013/0223295 A1* | 8/2013 | Choi et al. | 370/280 |
| 2013/0242816 A1* | 9/2013 | He et al. | 370/280 |
| 2013/0242819 A1* | 9/2013 | He et al. | 370/280 |
| 2013/0272169 A1 | 10/2013 | Wang | |
| 2013/0279481 A1* | 10/2013 | Horiuchi et al. | 370/336 |
| 2013/0286901 A1* | 10/2013 | Yuan et al. | 370/279 |
| 2013/0294297 A1* | 11/2013 | Lee | 370/280 |
| 2013/0301433 A1* | 11/2013 | Yin et al. | 370/252 |
| 2013/0308550 A1* | 11/2013 | Yin et al. | 370/329 |
| 2013/0336160 A1* | 12/2013 | Yin et al. | 370/254 |
| 2014/0044066 A1* | 2/2014 | Hsieh et al. | 370/329 |
| 2014/0086112 A1* | 3/2014 | Stern-Berkowitz et al. | 370/280 |
| 2014/0204783 A1* | 7/2014 | Lin et al. | 370/252 |
| 2014/0269539 A1* | 9/2014 | Yin et al. | 370/329 |
| 2014/0293842 A1* | 10/2014 | He et al. | 370/280 |

OTHER PUBLICATIONS

3GPP TSG RAN1#53-Bis—R1-082473, Agenda Item: 61, Source: Motorola, Title: Remaining Details on ACK/NACK Bundling for TDD, Document for Discussion—Jun. 29-Jul. 4, 2008 (4 pages).

3GPP TSG RAN WG1 Meeting #72—R1-130130, Source: ZTE, Title: HARZ timing in TDD-eIMTA, Agenda Item: 7.3.3.3, Document for Discussion and Decision, Jan. 28-Feb. 1, 2013 (4 pages).

3GPP TSG RAN WG1 Meting #72—R1-130370, Agenda Item: 7.3.3.3, Source: NEC Group, Title: Reconfiguration signalling and HARQ-timing for TDD eIMTA system, Document for Discussion, Jan. 28-Feb. 1, 2013 (4 pages).

3GPP TSG-RAN WG1 #72—R1-130558, Source: Ericsson, ST-Ericsson, Title: Signalling support for dynamic TDD, Agenda Item: 7.3.3.3, Document for Discussion and Decision—Jan. 28-Feb. 1, 2013 (4 pages).

3GPP TS 36.211, V11.2.0, 3rd Generation Partnership Project; Technical Specification Group Radio Access Network; Evolved Universal Terrestrial Radio Access (E-UTRA); "Physical Channels and Modulation"; Release 11, Feb. 2013, (109 pages).

3GPP TS 36.213, V11.2.0; 3rd Generation Partnership Project; Technical Specification Group Radio Access Network; Evolved Universal Terrestrial Radio Access (E-UTRA); "Physical Layer Procedures", Release 11; Feb. 2013, (173 pages).

3GPP TS 36.212, V11.2.0; 3rd Generation Partnership Project; Technical Specification Group Radio Access Network; Evolved Universal Terrestrial Radio Access (E-UTRA); "Multiplexing and Channel Coding," Release 11; Feb. 2013, (82 pages).

3GPP TS 36.306, V11.3.0; 3rd Generation Partnership Project; Technical Specification Group Radio Access Network; Evolved Universal Terrestrial Radio Access (E-UTRA); "User Equipment (UE) Radio Access Capabilities," Release 11; 2003-2013, (27 pages).

3GPP TSG-RAN Meeting #50; RP-101265, Source: Ericsson; "New Study Item Proposal for UL-DL Flexibility and Interference Management in LTE TDD", for approval; Agenda item 12.2; Istanbul, Turkey, Dec. 7-10, 2010; (5 pages).

3GPP TSG-RAN Meeting #51; RP-110440; Source: CATT, Ericsson; "New Study Item Proposal for Further Enhancements to LTE TDD for DL-UL Interference Management and Traffic Adaptation," for approval; Agenda item 14.2; Kansas City, USA, Mar. 15-18, 2010, (6 pages).

TSG SA WG4 Meeting #68 Document List; Apr. 16-20, 2012; (19 pages).

Yiping Wang, Patent Application No. 13861522; Selecting an Uplink-Downlink Configuration for a Cluster of Cells; filed Apr. 12, 2013; (58 pages).

3GPP TS 36.331, V11.3.0; 3rd Generation Partnership Project; Technical Specification Group Radio Access Network; Evolved Universal Terrestrial Radio Access (E-UTRA); "Radio Resource Control (RRC)"; Protocol Specification, Release 11); Mar. 2013; (344 pages).

3GPP TR 36.828 V11.0.0; 3rd Generation Partnership Project; Technical Specification Group Radio Access Network; Evolved Universal Terrestrial Radio Access (E-UTRA); "Further Enhancements to LTE Time Division Duplex (TDD) for Downlink-Uplink (DL-UL) Interference Management and Traffic Adaptation", (Release 11), Jun. 2012, (109 pages).

3GPP TSG-RAN WG1 #68bis, R1-121529; Agenda Item: 7.10.1; Source-Intel Corporation; "Performance Analysis of DL-UL Interference Management and Traffic Adaptation in Multi-Cell Pico-Pico Deployment Scenario," for Discussion and Decision; Jeju, Korea, Mar. 26-30, 2012, (12 pages).

3GPP TSG RAN WG1 Meeting #69, R1-122061, Source: CATT; "Discussion on Interference Mitigation Schemes for FS_LTE_TDD_eIMTA", Agenda item 7.10.1, For Discussion and Decision; Prague, Czech Republic, May 21-25, 2012; (2 pages).

3GPP TSG RAN WG1, Meeting #69, R1-122879, Source: CATT; "Evaluation on TDD UL/DL Reconfiguration with Interference Mitigation in Multi-Cell Pico Scenario"; Agenda item 7.10.1; For Discussion and Decision; Prague, Czech Republic, May 21-25, 2012, (12 pages).

3GPP TSG-RAN Meeting #51, RP-110450, Source: CATT; "New Study Item Proposal for Further Enhancements to LTE TDD for DL-UL Interference Management and Traffic Adaptation," Agenda item: 14.2; Mar. 15-18, 2010 (6 pages).

Wang et al., U.S. Appl. No. 13/448,212 entitled "HARQ for Dynamic Change of the TDD UL/DL Configuration in LTE TDD Systems" filed Apr. 16, 2012 (46 pages).

* cited by examiner

| Uplink-downlink configuration | Downlink-to-uplink switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 1

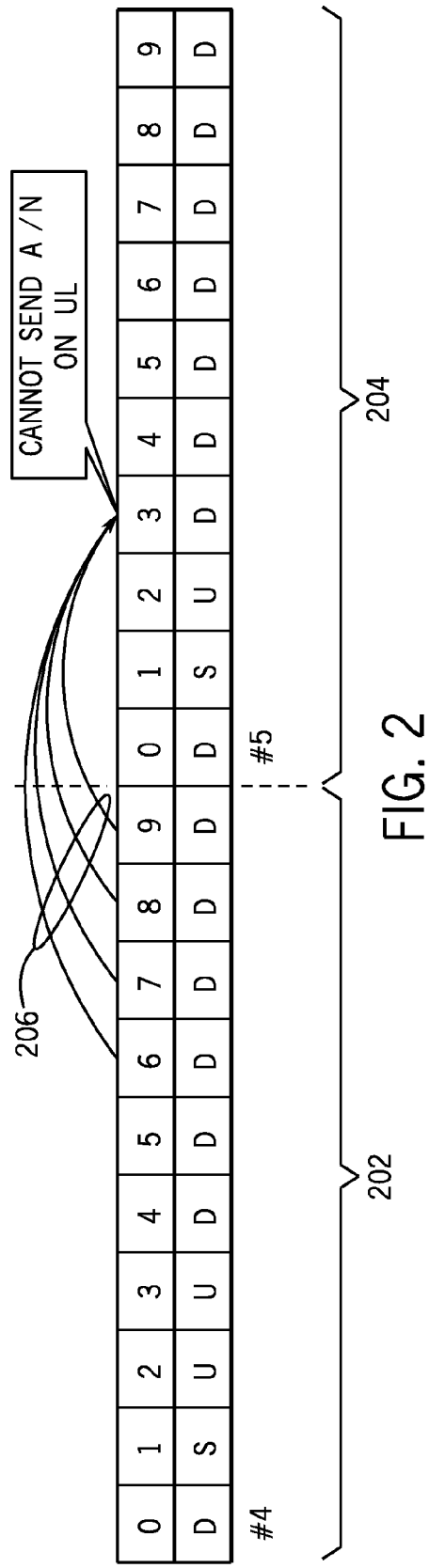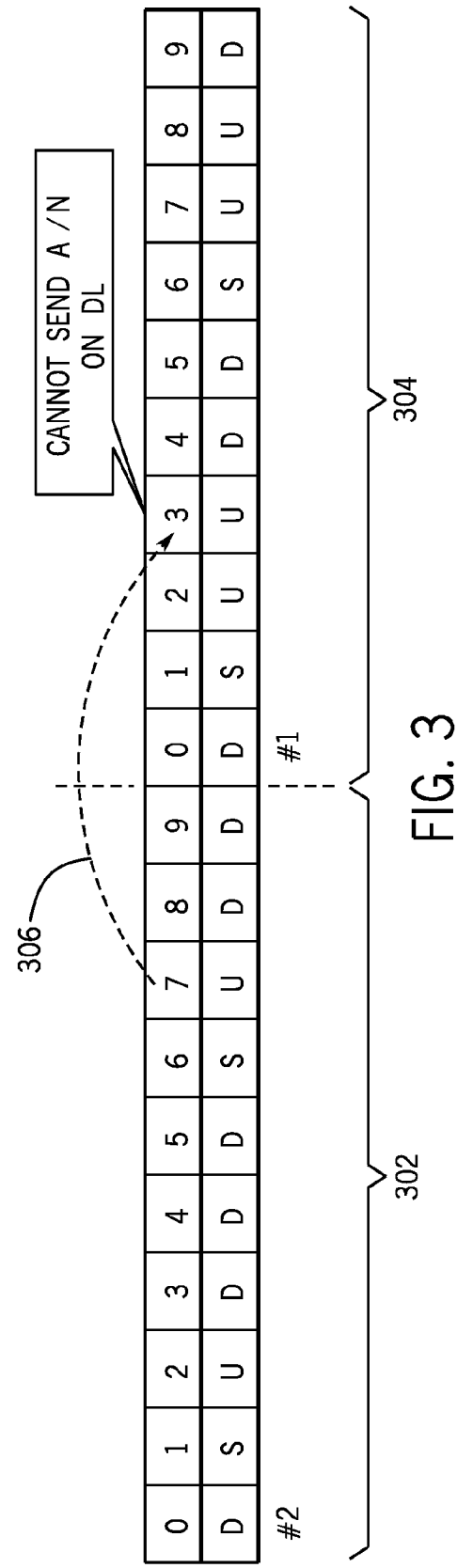

COMMUNICATION IN THE PRESENCE OF UPLINK-DOWNLINK CONFIGURATION CHANGE

BACKGROUND

In a wireless communication system, downlink and uplink transmissions of information (control signaling or data) can be according to either a frequency division duplex (FDD) mode or a time division duplex (TDD) mode. In the FDD mode, uplink and downlink transmissions are separated in the frequency domain, by transmitting uplink data using a first carrier frequency, and transmitting downlink data using a second carrier frequency. In the TDD mode, on the other hand, both uplink and downlink transmissions occur on the same carrier frequency; however, uplink and downlink transmissions are separated in the time domain, by sending uplink and downlink transmissions in different time periods.

In some wireless communications systems, different uplink-downlink configurations may be defined. A particular uplink-downlink configuration can specify that, within a frame, a first subset of subframes in the frame is used for uplink transmissions, and a second subset of subframes in the frame is used for downlink transmissions. Different uplink-downlink configurations can employ different numbers of uplink and downlink subframes.

BRIEF DESCRIPTION OF THE DRAWINGS

Some embodiments are described with respect to the following figures:

FIG. 1 is a schematic diagram of different uplink-downlink configurations, according to some examples;

FIGS. 2-4 are schematic diagrams illustrating a change of uplink-downlink configurations;

FIGS. 6-9 are schematic diagrams depicting timing relationships for communicating an acknowledgement indication of downlink data in response to a configuration change between uplink-downlink configurations, according to some implementations;

DETAILED DESCRIPTION

Figure 4:
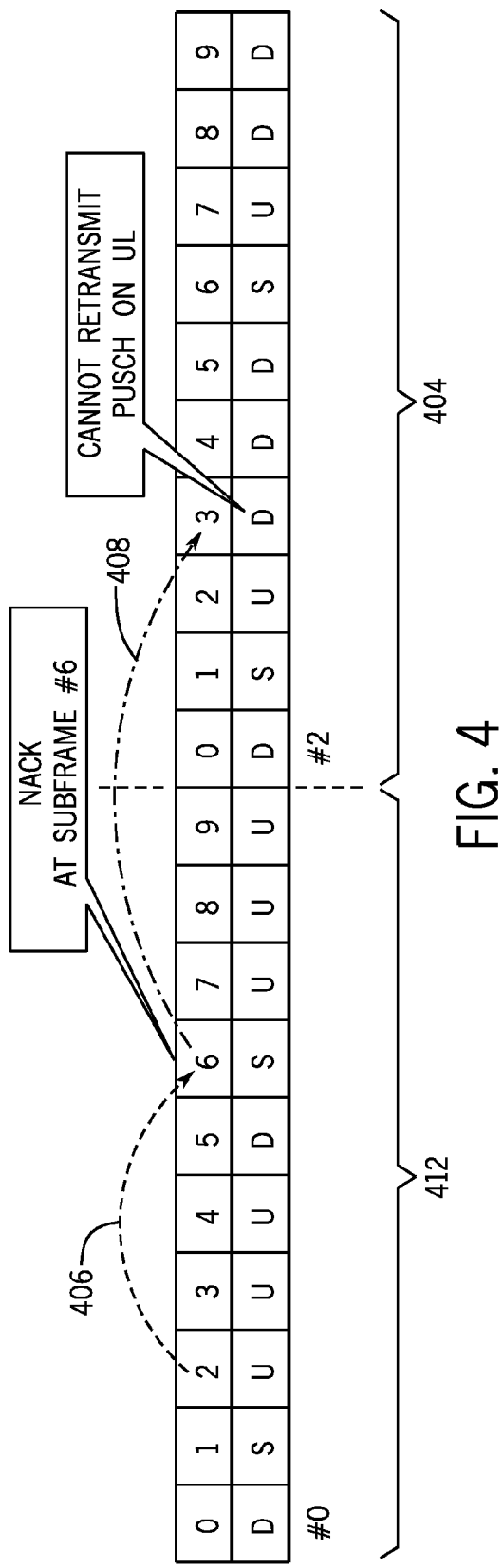

In a wireless communications network, different time division duplex (TDD) mode configurations may be employed. Such configurations can be referred to as TDD uplink-downlink configurations (or more simply, uplink-downlink configurations), such as those used in a Long Term Evolution (LTE) network that operates according to LTE standards provided by the Third Generation Partnership Project (3GPP). The LTE standards are also referred to as the Evolved Universal Terrestrial Radio Access (E-UTRA) standards. Although reference is made to LTE in the ensuing discussion, it is noted that techniques or mechanisms according to some implementations can be applied to other wireless access technologies.

An uplink-downlink configuration defines a number of uplink and downlink subframes that can be used within a frame structure. According to LTE, a frame structure is referred to as a radio frame, where the radio frame has a number of subframes. A subframe refers to a segment of an overall frame, where the segment has a specified time interval.

FIG. 1 shows an example table listing seven different uplink-downlink configurations that are used for TDD communications in an LTE network. A first column 102 of the table shown in FIG. 1 identifies the seven different uplink-downlink configurations (0-6). A second column 104 refers to the corresponding downlink-to-uplink switch-point periodicity (or more simply, "switching periodicity"), which represents a period in which the same switching pattern is repeated between the uplink and the downlink. According to LTE, the switching periodicity can be 5 milliseconds (ms) or 10 ms. Uplink-downlink configuration 1 has a 5 ms downlink-to-uplink switch-point periodicity, for example.

As depicted in a third column 106 in the table of FIG. 1, a frame is divided into 10 subframes, having subframe numbers 0-9. In the table, "D" represents a downlink subframe, "U" represents an uplink subframe, and "S" represents a special subframe which includes three parts: a downlink pilot time slot (DwPTS), an uplink pilot time slot (UpPTS), and a guard period (GP). Downlink transmissions on a physical downlink shared channel (PDSCH) can be made in a D subframe or in the DwPTS portion of a special subframe. The guard period (GP) of a special (S) subframe is to provide a transition interval between switching from downlink transmissions to uplink transmissions.

In the ensuing discussion, a "downlink" subframe can refer to either a D subframe or an S subframe.

As indicated in column 106, uplink-downlink configuration 2 has a 5 ms switching periodicity. The frame for uplink-downlink configuration 2 can be divided into two halves, where a first half includes subframe numbers 0-4, and a second half includes subframe numbers 5-9. The first half-frame for uplink-downlink configuration 2 includes the following pattern of subframes: D, S, U, D, D. The same pattern repeats in the second half-frame for uplink-downlink configuration 2. According to LTE, a frame has a length of 10 ms and each subframe has a length of 1 ms. Since the period in which the same switching pattern (D, S, U, D, D) for uplink-downlink configuration 2 is repeated is the period of half a frame (five subframes or 5 ms), the switching periodicity for uplink-downlink configuration 2 is 5 MS.

As can be seen in FIG. 1, certain uplink-downlink configurations support a larger number of downlink subframes than uplink subframes, while other uplink-downlink configurations may support a larger number of uplink subframes than downlink subframes. Uplink-downlink configuration 5 has the largest number of downlink subframes, while uplink-downlink configuration 0 has the largest number of uplink subframes.

The different uplink-downlink configurations provide for flexibility in terms of proportional resources assignable to uplink and downlink communications within a given assigned frequency spectrum. The different uplink-downlink configurations allow for distribution of radio resources unevenly between uplink and downlink communications. As a result, radio resources may be used more efficiently by selecting an appropriate uplink-downlink configuration based on traffic characteristics and interference conditions in uplink and downlink communications.

For some applications, the proportion of uplink and downlink traffic data (e.g. web browsing data, voice data, etc.) may change relatively rapidly. In an LTE system, an uplink-downlink configuration for TDD mode communication can be semi-statically assigned every 640-ms. In other words, within the 640-ms time interval, the uplink-downlink configuration assigned for communications within a particular cell stays static. However, keeping the uplink-downlink configuration static for such a relatively long time interval may not lead to efficient use of radio resources, particularly when the traffic patterns of UEs within the cell are changing relatively rapidly.

In accordance with some implementations, dynamic TDD uplink-downlink reconfiguration is provided, in which uplink-downlink configurations for communications with a UE can be changed relatively frequently (more frequently than allowed by current LTE standards).

Dynamically changing TDD uplink-downlink configurations can cause timing issues associated with hybrid automatic repeat request (HARQ) operations. HARQ provides for the provision of error detection and correction information from a transmitter to a receiver in association with transmitted data to allow the receiver to detect and possibly correct errors in the data. The receiver can provide either a positive acknowledgement (ACK) or a negative acknowledgement (NACK) in response to receiving the data. If the transmitter receives an ACK from the receiver in response to previously sent data, then the transmitter can transmit new data to the receiver. However, if the transmitter receives a NACK, then the HARQ process of the transmitter can retransmit the previously sent data.

The LTE standards provide for a timing linkage (or timing relationship) between the transmission of data (either downlink data or uplink data) and the responsive return of the acknowledgement indication (either ACK or NACK) from the receiver. Such timing linkage (or timing relationship) can include a downlink HARQ ACK/NACK timing linkage (for acknowledging downlink data) or an uplink HARQ ACK/NACK timing linkage (for acknowledging uplink data).

According to LTE, the downlink HARQ operation (for acknowledging downlink data sent from a wireless access network node to a UE) is asynchronous, in which the receiver does not know ahead of time what is being transmitted or when. Stated differently, the receiver (more specifically the UE) does not know which HARQ process at the wireless access network node is transmitting the downlink data, and does not know ahead of time the redundancy version (RV) value of the downlink transmission. Different RV values represent different combinations of data, error detection information, and error correction information sent from a transmitter to a receiver. The wireless access network node can send the HARQ process identifier (for identifying an HARQ process) and the RV value in a resource allocation message that is sent on a control channel to the UE, in some examples. For example, if the downlink data is sent in the PDSCH, then the HARQ process identifier can be sent in a PDSCH resource allocation message sent on a physical downlink control channel (PDCCH).

For an uplink transmission, synchronous HARQ operation is performed, in which the wireless access network node knows ahead of time the HARQ process and RV value associated with uplink data to be transmitted by a UE within a particular subframe. An HARQ process refers to an instance of an HARQ entity that controls an HARQ operation. Multiple HARQ processes can be executed in parallel, for communicating respective blocks of data (downlink or uplink data).

To address timing relationships impacted by TDD uplink-downlink configuration changes, techniques or mechanisms according to some implementations are able to send acknowledgement indications of uplink or downlink data in appropriate subframes.

An example of a timing linkage issue associated with a downlink HARQ operation when a configuration change occurs from uplink-downlink configuration 4 to uplink-downlink configuration 5 is depicted in FIG. 2.

FIG. 2 shows two frames 202 and 204, where a first frame 202 is according to uplink-downlink configuration 4, whereas a second frame 204 immediately following the first frame 202 is according to uplink-downlink configuration 5. In the example of FIG. 2, a configuration change (also referred to as a reconfiguration) has occurred between frames 202 and 204. According to uplink-downlink configuration 4, the acknowledgement indication (ACK or NACK) for a downlink data transmission (on PDSCH, for example) at any of subframes 6, 7, 8, and 9 are to be transmitted on uplink subframe 3 in the next frame, as indicated by arrows 206. In other words, downlink data transmission at subframe 6, 7, 8, or 9 is linked to subframe 3. However, as depicted in FIG. 2, subframe 3 in the second frame 204 for configuration 5 is a downlink subframe, rather than an uplink subframe as would be the case for uplink-downlink configuration 4. As a result, subframe 3 in frame 204 according to uplink-downlink configuration 5 cannot be used to send an ACK/NACK in the uplink direction to acknowledge transmitted downlink data in subframe 6, 7, 8, or 9 in the first frame 202. In the example of FIG. 2, after the uplink-downlink configuration change, the second frame 204 has an arrangement of subframes that is incompatible with the timing linkage expected by the uplink-downlink configuration prior to the configuration change.

FIG. 3 illustrates an issue associated with transmitting an acknowledgement indication for uplink data in response to a TDD uplink-downlink configuration change, which in FIG. 3 is a change from uplink-downlink configuration 2 (for a first frame 302) to uplink-downlink configuration 1 (for a second frame 304 immediately following the first frame 302). According to the timing relationship specified by uplink-downlink configuration 2, the ACK/NACK for uplink data (such as uplink data sent in the physical uplink shared channel or PUSCH) at subframe 7 is supposed to be transmitted at downlink subframe 3, as indicated by arrow 306. However, in the second frame 304 after the configuration change, subframe 3 is no longer a downlink subframe, but rather, is an uplink subframe. Accordingly, the ACK/NACK for the uplink data sent at subframe 7 in the first frame 302 cannot be sent in subframe 3 in the second frame 304.

As noted above, the uplink HARQ operation is synchronous. As a result, in addition to the uplink HARQ timing issue discussed in connection with FIG. 3, a grant timing relationship also has to be considered in response to an uplink-downlink configuration change. To enable a UE to send uplink data, a wireless access network node sends an uplink grant to the UE, where the uplink grant identifies the next subframe in which the UE is to send uplink data. Note that the next uplink data to be sent by the UE in response to the uplink grant can be a transmission of new uplink data or a retransmission of previously sent uplink data that was not received by the wireless access network node.

FIG. 4 shows an example of a configuration change from uplink-downlink configuration 0 (for a first frame 402) to uplink-downlink configuration 2 (for a second frame 404 immediately following the first frame 402). As indicated by arrow 406, the acknowledgement indication for the uplink data sent at subframe 2 in the first frame 402 is sent by the wireless access network node in the downlink in subframe 6 of the first frame 402. In the example of FIG. 4, it is assumed that the acknowledgement indication sent in subframe 6 of the first frame 402 is NACK, which indicates that the uplink data sent at subframe 2 in the first frame 402 was not successfully received by the wireless access network node. In response to the NACK at subframe 6 in the first frame 402, the retransmission of the uplink data should occur in subframe 3 in the next frame, as indicated by arrow 408. However, due to the configuration change, subframe 3 in the next frame 404 is a downlink subframe, instead of an uplink subframe, so that the retransmission of the uplink data cannot occur in subframe 3 in the second frame 404. As a result, retransmission of the uplink data cannot occur in subframe 3 of the second frame 404, as expected by the timing relationship for configuration 0.

Simply declaring data reception error and passing the error to upper layers of a protocol stack in response to failure to receive an acknowledgement (ACK or NACK) can lead to increased traffic delay and decreased efficiency of radio resource usage if configuration changes occur relatively frequently.

In accordance with some implementations, continuity of the HARQ timing relationship is provided for both uplink and downlink HARQ operations after a configuration change. The following discusses examples relating to techniques or mechanisms provided for downlink HARQ operation in the presence of a TDD uplink-downlink configuration change, and an uplink HARQ operation in the presence of a TDD uplink-downlink configuration change.

In some implementations, it is assumed that a TDD uplink-downlink configuration change occurs at a frame boundary (a boundary between frames). A UE may be informed of the configuration change before the frame boundary. Different UEs may be informed of the change at different times. In the ensuing discussion, it is assumed that the configuration change occurs at the boundary of frame n and frame n+1.

Figure 5:
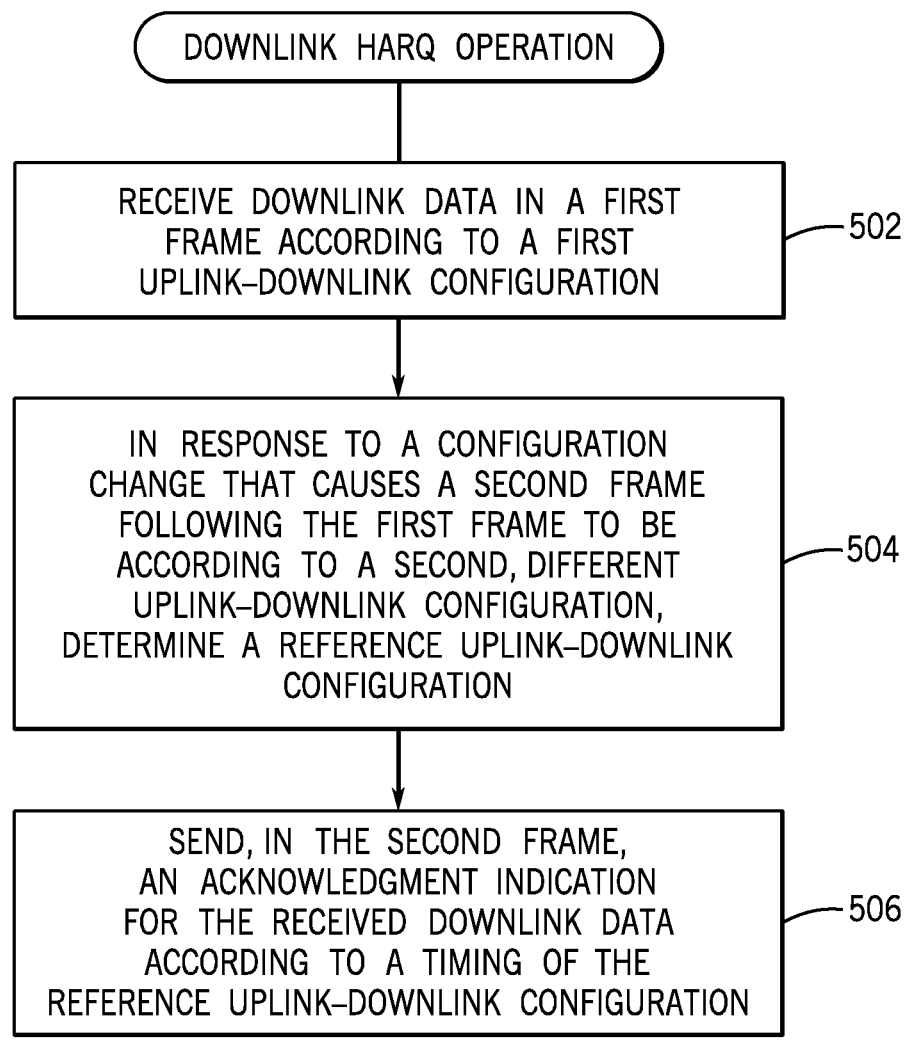
FIG. 5 is a flow diagram of a downlink hybrid automatic repeat request (HARQ) operation according to some implementations.

In some specific examples, the downlink HARQ ACK/NACK timing relationship can be according to Table 1 below, which is reproduced from Table 10.1.3.1-1 in 3GPP TS 36.213. Table 1 associates an uplink subframe n, which conveys ACK/NACK, with downlink subframes $n-k_i$, $i=0$ to $M-1$.

change. FIG. 5 is a flow diagram of a downlink HARQ operation according to some implementations. The process of FIG. 5 can be performed by a UE, in accordance with some implementations.

The process receives (at 502) downlink data in a first frame according to a first uplink-downlink configuration. In response to a configuration change that causes a second frame following the first frame to be according to a second, different uplink-downlink configuration, the process determines (at 504) a reference uplink-downlink configuration based on at least one of the first and second uplink-downlink configurations.

The process then sends (at 506), in the second frame, an acknowledgement indication for the received downlink data according to a timing of the reference uplink-downlink configuration.

Note that the determining (at 504) performed according to FIG. 5 can include selecting an uplink-downlink configuration, based on at least one rule (discussed below). The selected reference uplink-downlink configuration can be the same as the first or second uplink-downlink configuration, or can be different from the first and second uplink-downlink configurations.

Figures 6, 7:
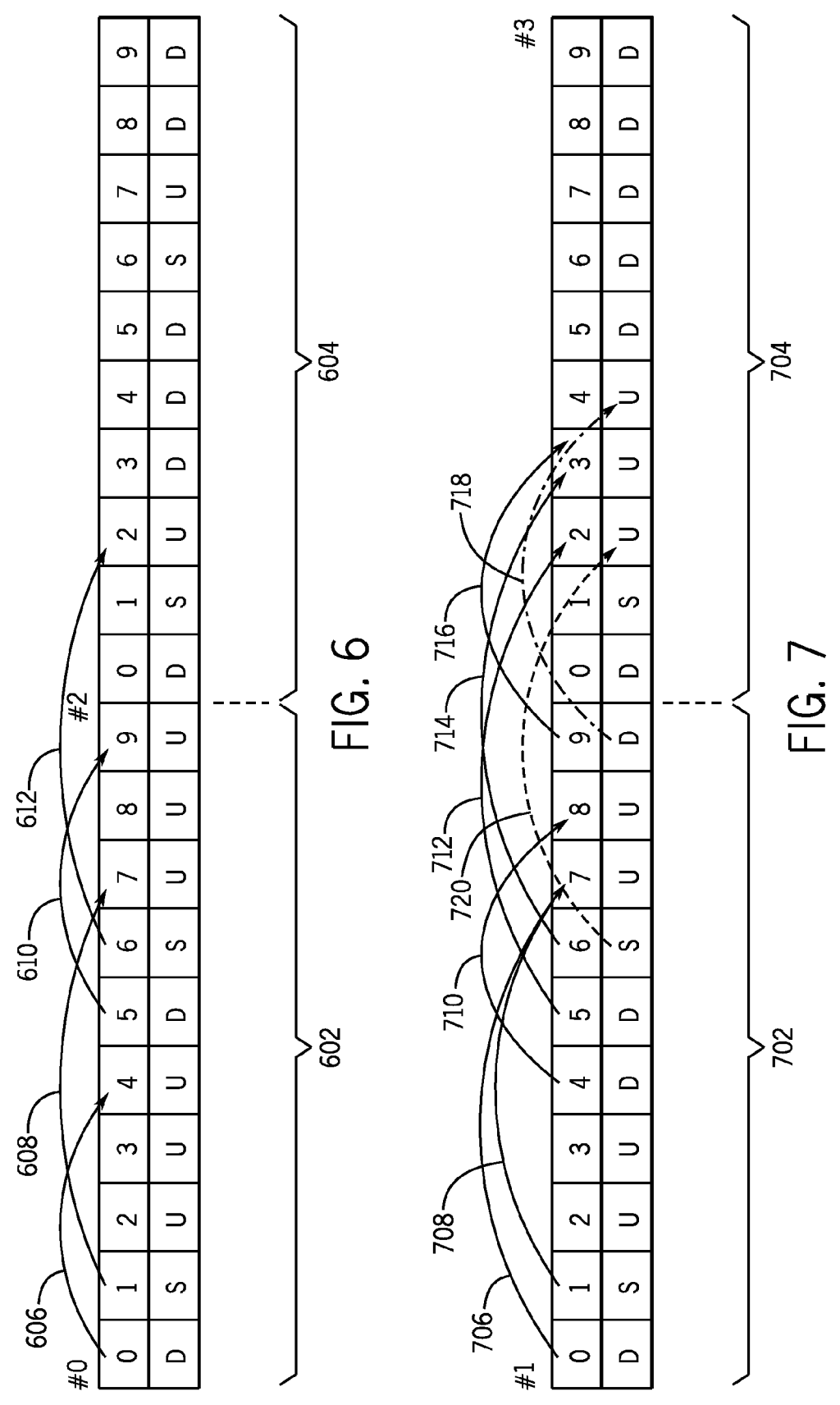

FIG. 6 illustrates an example of a configuration change from configuration 0 (for a first frame 602) to configuration 2 (for a second frame 604 immediately following the first frame 602). In the first frame 602, downlink data transmitted in each downlink subframe, except subframe 6, of the first frame 602 can be acknowledged within the same frame 602, as indicated by arrows 606, 608, and 610. If the timing relationship of configuration 0 for downlink HARQ operation is followed, then the downlink data sent in subframe 6 should be acknowledged (by communicating an ACK or NACK) at subframe 2 in the second frame 604 (as indicated by arrow 612). Note that subframe 2 in a frame is always an uplink subframe in all seven of the uplink-downlink configurations shown in FIG. 1. Accordingly, if the configuration of the first frame 602 is configuration 0, then the downlink HARQ timing of configuration 0 can be followed regardless of the configuration of the second frame 604. In the example of FIG. 6, the reference uplink-downlink configuration is configuration 0, which is determined (at 504) based on a rule governing the case where the first frame before the configuration change is configuration 0.

In alternative implementations, the downlink HARQ timing can be according to configuration 5 in the second frame following the configuration change, regardless of the configuration of the first frame prior to the configuration change. This is possible because configuration 5 (as shown in FIG. 1) has just one uplink subframe (subframe 2), while the remaining subframes are downlink subframes. Thus, the downlink

TABLE 1

| Uplink-downlink Configuration | Downlink association set index K: $\{k_0, k_1, \ldots, k_{M-1}\}$ Subframe n | | | | | | | | |
|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Downlink HARQ Operation in the Presence of a TDD Uplink-Downlink Configuration Change For a downlink HARQ operation, a downlink data (e.g. PDSCH) transmission or retransmission is to be properly acknowledged after the TDD uplink-downlink configuration HARQ timing of configuration 5 uses subframe 2 to acknowledge (by sending an ACK or NACK) all downlink data sent in an immediately preceding frame. In such alternative implementations, the reference uplink-downlink configuration determined (at 504) in FIG. 5 is configuration 5.

In further implementations, if the configuration change involves configurations that use the 5-ms switching periodicity (configurations 0, 1, 2, and 6 in FIG. 1), then the downlink HARQ timing can follow the timing of configuration 2 regardless of the configuration of the first and second frames before and after the configuration change. In such further implementations, the reference uplink-downlink configuration is configuration 2, according to a rule governing the case where the configuration change involves configurations that use the 5-ms switching periodicity (in other words, both the first and second frames before and after the configuration change use the 5-ms switching periodicity).

A more generalized implementation for downlink HARQ operations that addresses a change from any first uplink-downlink configuration to any other uplink-downlink configuration is provided below. In a first frame (current frame n) prior to a configuration change, downlink data transmission in certain subframes of the first frame may be acknowledged within the same first frame (current frame n). However, at least one downlink data transmission in the current frame n has to be acknowledged in the next frame n+1 following the configuration change.

The following rules can be specified regarding downlink HARQ timing. The downlink HARQ timing (or more specifically, the PDSCH HARQ timing) can be based on the configuration of the current frame n, if the downlink data can be acknowledged within this current frame n. However, if the acknowledgement indication (ACK or NACK) has to be provided in the subsequent frame n+1, then the timing follows a reference uplink-downlink configuration (determined at 504 in FIG. 5), which can be determined based on the set of downlink subframes of the configuration of the current frame n and the set of subframes of the configuration of the subsequent frame n+1 following the configuration change. A set DLSF (DownLink SubFrame) can represent the set of downlink subframes (which includes the D subframes and S subframes in FIG. 1, for example) within a specific radio frame. DLSF(n) represents the set of downlink subframes in frame n. DLSF(n+1) represents the set of downlink subframes in frame n+1. In a first case (Case 1), if DLSF(n) is a superset of DLSF(n+1), then the reference configuration is the configuration of the current frame n, in which case the HARQ timing follows the timing of the current configuration (of frame n), which is specified as the reference configuration. DLSF(n) is a superset of DLSF(n+1) if each downlink subframe in DLSF(n+1) is included in DLSF(n).

In a second case (Case 2), if DLSF(n) is a subset of DLSF(n+1), then the reference configuration is the configuration following the configuration change (in other words, the configuration of frame n+1). DLSF(n) is a subset of DLSF(n+1) if each downlink subframe in DLSF(n) is included in DLSF(n+1).

In a third case (Case 3), if DLSF(n) is neither a superset nor a subset of DLSF(n+1), then the reference configuration is the configuration that includes downlink subframes that make up the union set of downlink subframes of the configuration before and the configuration after the configuration change. In other words, the reference configuration in this case is the uplink-downlink configuration having a set of downlink subframes according to DLSF(n)∪ DLSF(n+1).

Assuming that the uplink-downlink configuration before a configuration change is referred to as configuration a and the uplink-downlink configuration after the configuration change is configuration b, then the combination of uplink-downlink configurations before and after the configuration change can be represented as (a,b). In view of the foregoing, different combinations fall into the three cases (Cases 1, 2, and 3) as follows:

Case 1 (18 combinations) where DLSF(n) ⊃ DLSF(n+1): (1,0), (1,6), (2,0), (2,1), (2,6), (3,0), (3,6), (4,0), (4,1), (4,3), (4,6), (5,0), (5,1), (5,2), (5,3), (5,4), (5,6), and (6,0);

Case 2 (18 combinations) where DLSF(n) ⊂ DLSF(n+1): (0,1), (0,2), (0,3), (0,4), (0,5), (0,6), (1,2), (1,4), (1,5), (2,5), (3,4), (3,5), (4,5), (6,1), (6,2), (6,3), (6,4), and (6,5);

Case 3 (6 combinations) where neither DLSF(n) ⊃ DLSF(n+1) nor DLSF(n) ⊂ DLSF(n+1): (1,3), (3,1), (2,3), (2,4), (3,2), and (4,2).

In alternative examples, instead of using the different HARQ timings of Case 1, Case 2, and Case 3 set forth above, the reference configuration can be defined according to Case 3. In other words, the reference configuration to be used for HARQ timing in the presence of a configuration change is the uplink-downlink configuration that includes the union of DLSF(n) and DLSF(n+1).

An example involving a configuration change from configuration 1 (frame 702) to configuration 3 (frame 704) is depicted in FIG. 7. Downlink data transmissions in subframes 0, 1, and 4 in frame n (702) can be acknowledged within the same frame n so they follow the downlink HARQ timing of configuration 1 (see arrows 706, 708, and 710). Downlink data transmissions in subframes 5, 6, 9 of frame n are acknowledged in the following frame, n+1.

Comparing DLSF(n) with DLSF(n+1) results in a determination that Case 3 above should be used as the reference configuration. The reference configuration is the uplink-downlink configuration that includes a set of subframes according to the union of DLSF(n) and DLSF(n+1). Taking the union of the DLSF(n) and DLSF(n+1) sets corresponding to configurations 1 and 3, respectively, results in the reference configuration being configuration 4. Therefore, following the downlink HARQ timing of configuration 4, subframe 5 in frame n is acknowledged at subframe 2 in frame n+1, and subframes 6 and 9 in frame n are acknowledged at subframe 3 in frame n+1 (see arrows 712, 714, and 716).

In alternative implementations, configuration 3 can be used as a reference configuration, in which case subframe 9 in frame n is acknowledged with subframe 4 in frame n+1 (arrow 718). As a further alternative, configuration 1 can be used as the reference configuration, in which case subframe 6 in frame n is acknowledged at subframe 2 in frame n+1 (arrow 720).

Table 2 below summarizes the reference configuration for cross-frame HARQ timing of all possible uplink-downlink configuration combinations, including a combination in which the original configuration is configuration 0, for use due to a configuration change. Multiple numbers in some entries represent alternative possible choices. An alternative mapping is also shown in Table 2 below where the destination configuration is always assumed for original uplink-downlink configuration 0 and 1 (in other words, for a configuration change where the original configuration is 0 or 1, the reference configuration can be the destination configuration).

TABLE 2

Reference configuration for cross frame PDSCH HARQ timing

| Original Uplink-Downlink Configuration | Destination Uplink-Downlink Configuration after change | | | | | | |
|---|---|---|---|---|---|---|---|
| | 0 | 1 | 2 | 3 | 4 | 5 | 6 |
| 0 | — | 0 or 1 | 0 or 2 | 0 or 3 | 0 or 4 | 0 or 5 | 0 or 6 |
| 1 | 1 | — | 2 | 4 or 1 or 3 | 4 or 1 | 5 | 1 or 6 |
| 2 | 2 | 2 | — | 5 or 3 | 5 or 4 | 5 | 2 |
| 3 | 3 | 4 | 5 | — | 4 | 5 | 3 |
| 4 | 4 | 4 | 5 | 4 | — | 5 | 4 |
| 5 | 5 | 5 | 5 | 5 | 5 | — | 5 |
| 6 | 6 | 1 | 2 | 3 | 4 | 5 | — |

In alternative implementations, configuration 5 can be used as the reference configuration for all reconfiguration combinations. Since, with configuration 5, all the PDSCH acknowledgement indications will be sent at subframe 2 which is always an uplink subframe, the timing linkage can be satisfied for any uplink-downlink configuration combination.

Figure 8:
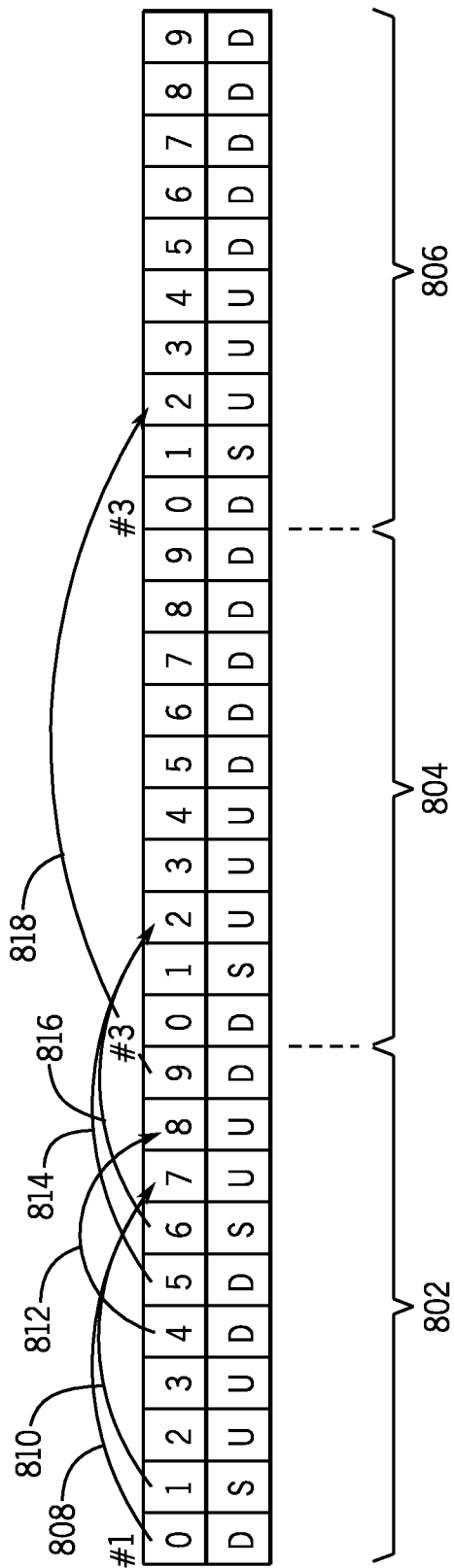

FIG. 8 shows an example where configuration 5 is used as the reference configuration regardless of the reconfiguration combination. In the example of FIG. 8, the configuration change occurs at the boundary between frames 802 and 804, and the configuration change is from configuration 1 to configuration 3. As indicated by arrows 808, 810, and 812, downlink data in subframes 0, 1, and 4 in frame 802 can be acknowledged within the same frame 802. However, the acknowledgement indications for subframes 5 and 6 in frame 802 are acknowledged in subframe 2 in the next frame 804, as indicated by arrows 814 and 816.

The timing linkage for the acknowledgement indications for subframes 5 and 6 in frame 802 follow the reference configuration that is selected to be configuration 5. However, according to configuration 5, an acknowledgement indication for subframe 9 in frame 802 would also have to be communicated in subframe 2 following the configuration change. However, as depicted in FIG. 8, there is an insufficient time length between subframe 9 in frame 802 and subframe 2 in frame 804. In some examples, a minimum of 4 ms has to exist between the transmission of downlink data and the subsequent communication of the acknowledgement indication. Since subframe 2 in frame 804 following frame 802 cannot satisfy this minimum time length, a subsequent frame 806 that is after frame 804 has to be used to communicate the acknowledgement indication for the downlink data in subframe 9 of frame 802. Arrow 818 indicates that the acknowledgement indication for subframe 9 in frame 802 is transmitted in subframe 2 in frame 806 that is the second frame following frame 802.

As noted above, if the configuration change is confined within uplink-downlink configurations with 5-ms switching periodicity, another alternative is to use the downlink HARQ timing linkage of uplink-downlink configuration 2 as the reference configuration for all reconfiguration combinations.

Figure 9:
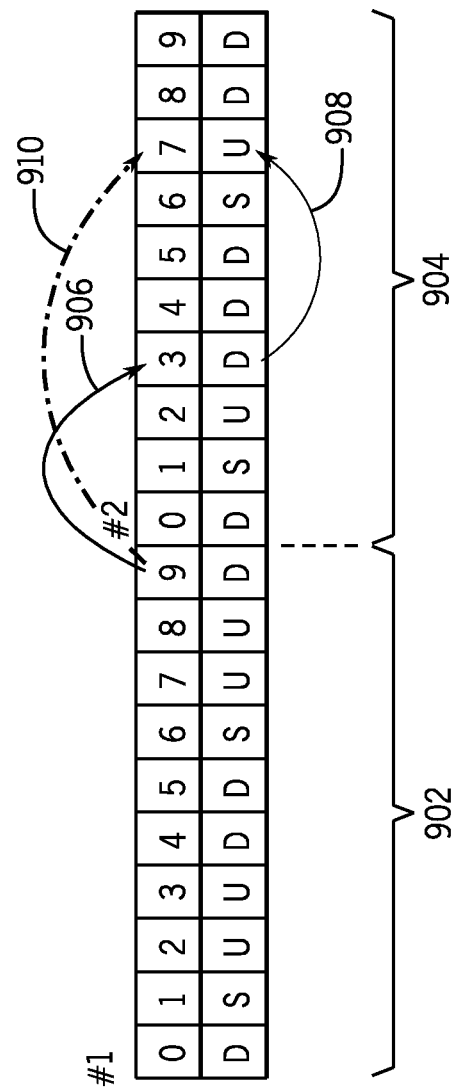

As another alternative, FIG. 9 shows an example where downlink data at subframe 9 of frame n (902) cannot be acknowledged using subframe 3 of frame n+1 (904) (arrow 906) due to the link direction change at subframe 3 in frame n+1 after the configuration change from configuration 1 to configuration 2. In FIG. 9, instead of sending an acknowledgement indication in subframe 3 of frame n+1, the wireless access network node can send a small (e.g. 1 resource block) HARQ retransmission of the corresponding transport block after the reconfiguration boundary at subframe 3 of frame n+1. Note that the retransmitted transport block in subframe 3 in frame n+1 does not actually contain the data that was originally sent in subframe 9 in frame n. The retransmitted transport block is a shell or container that includes information identifying the previously sent data, without including the data.

In response to the retransmitted transport block in subframe 3 of frame n+1, the UE sends an ACK/NACK following the HARQ timing of configuration 2. Therefore, the UE can convey the ACK/NACK at subframe 7 of frame n+1, as indicated by arrow 908. Note that the ACK/NACK at subframe 7 of frame n+1 is an acknowledgement indication for the original downlink data transmitted at subframe 9 in frame n, as indicated by arrow 910.

As a further alternative, if there is no timing linkage for downlink HARQ operation due to an uplink-downlink configuration change, NACK can be assumed by the wireless access network node. In this case, the wireless access network node can send a retransmission of the corresponding transport block afterward and receive an ACK/NACK in response to the retransmitted transport block.

In general, according to the foregoing alternative implementations, a wireless access network node sends downlink data to a UE in a first frame according to a first uplink-downlink configuration. In response to a configuration change that causes a second frame following the first frame to be according to a second, different uplink-downlink configuration, the wireless access network node determines that a subframe in the second frame is unavailable for receiving an acknowledgement indication from the UE of the downlink data. In response, the wireless access network node re-transmits a transport block corresponding to the downlink data to the UE, and the wireless access network node receives an acknowledgement indication in response to the re-transmitted transport block.

Acknowledgement Bundling Versus Acknowledgement Multiplexing

The acknowledgement indication (ACK or NACK) for downlink data (sent in PDSCH) is transmitted either on the PUCCH or the PUSCH, depending upon whether there is simultaneous uplink data to send in the same uplink subframe. In some cases, the ACK/NACK associated with more than one PDSCH can be mapped into a single uplink subframe. Two downlink HARQ acknowledgement modes are supported in TDD operation according to LTE: ACK/NACK bundling mode and ACK/NACK multiplexing mode. In the bundling mode, a logical AND operation of ACK/NACKs for multiple downlink subframes whose associated ACK/NACKs are mapped into the same uplink subframe can be performed. With the bundling mode, a single ACK/NACK (created by the logical AND operation) is transmitted in response to multiple downlink data transmissions whose ACK/NACKs map to the same uplink subframe.

With the multiplexing mode, the ACK/NACKs that are mapped to the same uplink subframe are transmitted separately in the same uplink subframe. In other words, multiple ACK/NACK bits are communicated in the same uplink subframe that can be detected separately by the receiver.

By using ACK/NACK bundling, fewer ACK/NACK bits have to be sent. For example, for configuration 1, data in subframes 0 and 1 are acknowledged in subframe 7. A single ACK/NACK that is a logical AND of the ACK/NACKs for downlink data transmissions in subframe 0 and 1 can be sent in the uplink subframe 7. If there is an ACK for subframe 0 and a NACK for subframe 1, then a NACK is sent as a result of the logical AND. This implies that both the downlink transmissions in subframes 0 and 1 would have to be retransmitted.

Uplink-downlink configuration 5 supports the bundling mode, but not the multiplexing mode. Thus, the use of bundling mode or multiplexing mode is to be considered when performing a configuration change, according to some implementations. If a current frame n uses the multiplexing mode, then, in some implementations, the wireless access network node is not allowed to perform a configuration change to configuration 5.

In alternative implementations, if the current frame n uses the multiplexing mode, and the wireless access network node reconfigures to configuration 5, then the UE can automatically switch to using the bundling mode after the configuration change.

Number of HARQ Processes in Downlink HARQ Operation

The maximum number of downlink and uplink HARQ processes per serving cell for a given UE can vary with the TDD uplink-downlink configuration. According to the LTE standards, the maximum number of downlink HARQ processes per serving cell is set forth in the table below:

| TDD Uplink-Downlink configuration | Maximum number of HARQ processes |
| --- | --- |
| 0 | 4 |
| 1 | 7 |
| 2 | 10 |
| 3 | 9 |
| 4 | 12 |
| 5 | 15 |
| 6 | 6 |

In the uplink, the number of HARQ processes per serving cell is set forth in the table below:

| TDD Uplink-Downlink configuration | Number of HARQ processes for normal HARQ operation |
| --- | --- |
| 0 | 7 |
| 1 | 4 |
| 2 | 2 |
| 3 | 3 |
| 4 | 2 |
| 5 | 1 |
| 6 | 6 |

Whenever the uplink-downlink configuration is changed, the number of HARQ processes is changed accordingly to match to the current configuration, in both the uplink and downlink directions. For downlink HARQ processes, it is relatively easier to handle the configuration change since each HARQ process is an asynchronous process and each downlink grant specifies an HARQ index number (to identify an HARQ process). When the number of HARQ processes changes to a larger or the same number after reconfiguration, the current m downlink HARQ buffer(s) should be able to directly transfer to the first m HARQ buffer(s) of the downlink HARQ processes after reconfiguration. An HARQ buffer is used to buffer downlink data that may potentially have to be retransmitted if a NACK is received.

When the number of HARQ processes changes to a smaller number due to reconfiguration, one or more of the following schemes can be used to handle the configuration change.

1. The number of HARQ buffers of the previous configuration is temporarily kept. The number of HARQ buffers is reduced to that of the new configuration by allowing the excessive number of HARQ processes to complete.
2. The wireless access network node uses a conservative modulation and code scheme (MCS) to send PDSCH to make sure that the UE will receive the PDSCH correctly and complete the HARQ transmission before the uplink-downlink configuration change in order to make the number of HARQ processes equal to the specified maximum number after the change.
3. As soon as the wireless access network node makes the decision to perform a configuration change, the wireless access network node may start to control the number of HARQ processes, prior to the reconfiguration, to the specified maximum number of the new configuration after the change by stopping the use of the extra downlink HARQ processes after the UE has acknowledged their contents.
4. The wireless access network node may terminate the excessive number of HARQ processes right before the reconfiguration. The resulting packet errors are passed to an upper layer (e.g. Radio Link Control or RLC layer) for handling.

Downlink HARQ Buffer Size and Rate Matching

Rate matching for PDSCH transmission is described in Section 5.1.4.1.2 of 3GPP TS 36.212. Rate matching uses a soft buffer, and ensures that coded bits at the output of a rate matching stage will fit in the soft buffer, as defined by the soft buffer size. The soft buffer size refers to the maximum number of received bits to be stored in a buffer used for HARQ packet combining for a UE. Rate matching creates an output bit stream having a target code rate.

The soft buffer size for a transport block is $N_{IR}$ bits, and the soft buffer size for the r-th code block is $N_{cb}$ bits. The size $N_{cb}$ for the PDSCH is obtained as follows, where C is the number of code blocks computed in Section 5.1.2 of 3GPP TS 36.212, and $K_w = 3K_\pi$ is the circular buffer length for the r-th code block.

$$N_{cb} = \min\left(\left\lfloor \frac{N_{IR}}{C} \right\rfloor, K_w\right),$$

for downlink turbo coded transport channels where $N_{IR}$ is equal to:

$$N_{IR} \left\lfloor \frac{N_{soft}}{K_{MIMO} \cdot \min(M_{DL\_HARQ}, M_{limit})} \right\rfloor,$$

where:
$N_{soft}$ is the total number of soft channel bits (see 3GPP TS 36.306);
$K_{MIMO}$ is equal to 2 if the UE is configured to receive PDSCH transmissions based on transmission modes 3 or 4 as defined in Section 7.1 of 36.213, 1 otherwise;
$M_{DL\_HARQ}$ is the maximum number of downlink HARQ processes as defined in section 7 in 3GPP TS 36.213; and
$M_{limit}$ is a constant (e.g. equal to 8).

With dynamic TDD uplink-downlink reconfiguration, $M_{DL\_HARQ}$ is the only quantity which may vary from one TDD uplink-downlink configuration to another in the above equations. TDD uplink-downlink configurations 2, 3, 4, and 5 all have $M_{DL\_HARQ}$ greater than $M_{limit}$, so switching between two configurations from this subset will not result in any change to $N_{IR}$ and $N_{cb}$. Conversely, if at least one of the two TDD uplink-downlink configurations used in the dynamic TDD reconfiguration belongs to the subset {0, 1, 6}, then $N_{IR}$ and as a result $N_{cb}$ will change as a result of the dynamic TDD reconfiguration.

The parameter $N_{cb}$ can determine which coded bits are actually retained and transmitted as part of the rate matching process described at the end of Section 5.1.4.1.2 of 3GPP TS 36.212. Two possible approaches for dealing with this potential "resizing" of $N_{cb}$ due to dynamic TDD reconfiguration are as follows.

First, following a TDD reconfiguration boundary (with a first TDD uplink-downlink configuration used before this boundary and a second different TDD uplink-downlink configuration used after this boundary), both new data transmissions and all HARQ retransmissions (including those for which the original first transmission of the transport block occurred before the reconfiguration boundary) would both use $N_{cb}$ as calculated using $M_{DL\_HARQ}$ for the second TDD uplink-downlink configuration.

Second, following a TDD reconfiguration boundary, new data transmissions and HARQ retransmissions of transport blocks originating after the reconfiguration boundary would use $N_{cb}$ as calculated using $M_{DL\_HARQ}$ for the second TDD uplink-downlink reconfiguration. HARQ retransmissions of transport blocks originating before the reconfiguration boundary would use $N_{cb}$ as calculated using $M_{DL\_HARQ}$ for the first TDD uplink-downlink reconfiguration.

Uplink Data Grant Timing

As noted above, in the uplink, an HARQ operation is synchronous. Thus, in addition to uplink HARQ timing relationships, grant timing relationships also have to be considered in response to TDD uplink-downlink configuration changes.

In accordance with some implementations, the uplink HARQ timing relationship and uplink HARQ grant timing relationship follow the timing relationship specified by the uplink-downlink configuration at the frame where the uplink transmission and uplink grant, respectively, are transmitted, with various exceptions as discussed below.

For retransmission of uplink data, the timing relationship follows that of the uplink-downlink configuration at the frame where the NACK is transmitted.

Uplink Grant Timing

The scheduling, using uplink grants, of uplink subframes in frame n+1 (which follows a configuration change after frame n) can raise issues under certain conditions. The default uplink grant timing linkage is determined by the current frame's uplink-downlink configuration. Thus, the timing linkage for the uplink grant is determined by the uplink-downlink configuration of the frame where the downlink subframe carrying the uplink grant is located.

Figures 10, 11:
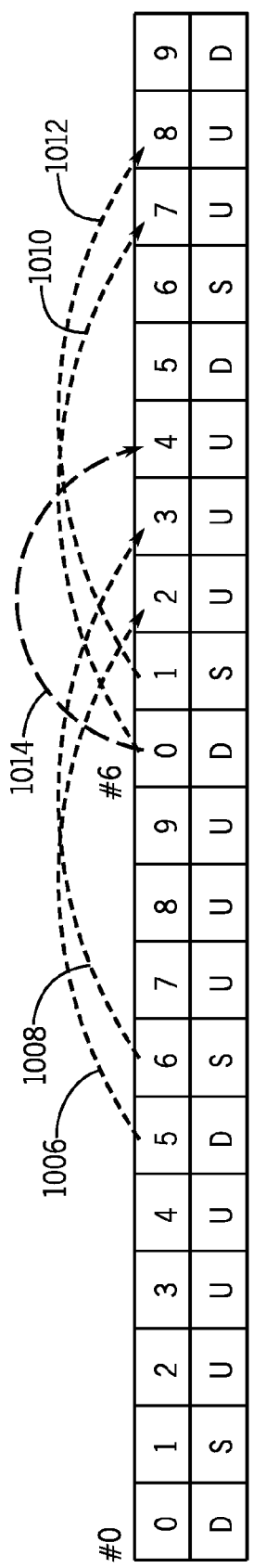
FIGS. 10-11 are schematic diagrams depicting uplink grant timing in the presence of a configuration change between different uplink-downlink configurations, according to further implementations.

FIG. 10 shows an example of a configuration change from configuration 0 (for current frame 1002) to configuration 6 (for second frame 1004 immediately following the first frame 1002). Arrows 1006 and 1008 depict grant timing relationships for uplink grants sent in subframes 5 and 6, respectively, in the first frame n (1002). According to arrow 1006, an uplink grant in subframe 5 in the current frame 1002 schedules an uplink data transmission in subframe 2 in the second frame 1004. Similarly, the arrow 1008 specifies that an uplink grant sent in the downlink subframe 6 in the current frame 1002 schedules an uplink data transmission in subframe 3 of the second frame 1004.

For configuration 0, an uplink grant sent in the downlink subframe 0 in the second frame 1004 would be able to schedule an uplink data transmission in the uplink subframe 4 in the second frame 1004. However, because of the configuration change to configuration 6, the current LTE standards would not allow for the downlink subframe 0 in the second frame 1004 to schedule an uplink data transmission in the uplink subframe 4. According to configuration 6, the downlink subframe 0 in the second frame 1004 can schedule uplink data transmission in uplink subframe 7 (arrow 1010), and the downlink subframe 1 in the second frame 1004 can schedule uplink data transmission in uplink subframe 8 in the second frame 1004 (arrow 1012).

To address the issue of the inability to schedule uplink data transmission in uplink subframe 4 in the second frame 1004 following a configuration change, a new uplink grant timing relationship (represented by arrow 1014) can be used, where an uplink grant sent in subframe 0 of the second frame 1004 can schedule uplink data transmission in the uplink subframe 4 in the second frame 1004. Thus, according to FIG. 10, multiple uplink subframes (two PDSCH subframes) can be scheduled from one downlink subframe (subframe 0 in the second frame 1004) by using a UL index, where the UL index can identify subframe 4 or subframe 7 in the second frame 1004.

FIG. 11 shows another example of an uplink grant timing in the context of a configuration change from configuration 2 (for the first frame 1102) to configuration 0 (for the second frame 1104). Arrows 1106, 1108, 1110, 1112, and 1114 depict grant timing relationships specified by current LTE standards. However, due to the configuration change, an uplink grant cannot schedule an uplink data transmission in subframe 3 in the second frame 1104 after the configuration change. As a result, a new uplink grant timing link, represented by arrow 1116, is defined for allowing an uplink grant sent in the downlink subframe 9 of the first frame 1102 to schedule an uplink data transmission in the uplink subframe 3 in the second frame 1104.

Thus, according to some implementations, the following uplink grant timing rule can be used for scheduling uplink transmissions in uplink subframes in the presence of a configuration change.

Generally, the timing linkage for uplink grant (timing between an uplink grant and the scheduled uplink data transmission or retransmission) is determined by the uplink-downlink configuration of the frame where the downlink subframe carrying the uplink grant is located, except:

(1) where the configuration of frame n before the configuration change is configuration 2 or 5, a new uplink grant link from subframe 9 in frame n to schedule subframe 3 in the subsequent frame n+1 is to be used for all configuration change combinations except for combination (2,5) (change from configuration 2 to configuration 5) or combination (5,2); and (2) where the configuration of frame n+1 after the configuration change is configuration 6, subframe 0 in frame n+1 is used to schedule subframe 4 and subframe 7 in frame n+1 in all change combinations where frame n+1 uses configuration 6.

The rule specified above indicates that, in response to a configuration change, a timing relationship between an uplink grant and a scheduled subframe of a frame for communicating uplink data is according to the uplink-downlink configuration of the frame carrying the uplink grant, unless the configuration change involves one of an enumerated set of configuration combinations (as specified in exceptions (1) and (2) above).

For exception (1) above, the new uplink grant timing linkage is from frame n before the configuration change to a subframe in frame n+1 after the configuration change (see arrow 1116 in FIG. 11). As a result, the UE has to know the configuration change at least one subframe in advance.

According to exception (1), if the configuration change is from configuration 2 to 5 or 5 to 2, no new uplink timing linkage has to be used.

For exception (2) in which the configuration change causes frame n+1 to be according to configuration 6, subframe 0 in frame n+1 initially only carries uplink grant for subframe 7. However, with the new timing linkage (arrow 1014 in FIG. 10, for example), subframe 0 in frame n+1 has to carry uplink grants for two uplink subframes 4 and 7 in frame n+1. One way to do this is to automatically use an uplink grant received in subframe 0 in frame n+1 for uplink transmissions in both subframes 4 and 7, without using uplink index bits. This should only happen at the TDD reconfiguration boundary. An example of the uplink grant timing with this scenario is shown in FIG. 10.

In some specific examples, the timing relationships for uplink grant, ACK/NACK and transmission/retransmission are specified in Table 3 below, which is reproduced from Table 8.2 of 3GPP TS 36.213. Upon detection of a PDCCH with downlink control information (DCI) format 0/4 and/or a physical HARQ indicator channel (PHICH) transmission in subframe n intended for the UE, the UE adjusts the corresponding PUSCH transmission in sub-frame n+k, where k is provided in entries in the table below.

For TDD uplink-downlink configuration 0, if the least significant bit of the uplink index in the DCI format 0/4 is set to 1 in subframe n or a PHICH is received in subframe n=0 or 5 in the resource corresponding to $I_{PHICH}=1$, or PHICH is received in sub-frame n=1 or 6, the UE adjusts the corresponding PUSCH transmission in sub-frame n+7. If, for TDD uplink-downlink configuration 0, both the most significant bit and least significant bit of the uplink index in the DCI format 0/4 are set in subframe n, the UE adjusts the corresponding PUSCH transmission in both subframes n+k and n+7, where k is given in Table 3 below.

TABLE 3 k for PUSCH transmission

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

Uplink HARQ and Retransmission Timing

Since the uplink HARQ operation is synchronous, various issues may arise as a result of an uplink-downlink configuration change that may not be present for the downlink HARQ operation. In particular, when an uplink-subframe heavy configuration is changed to a downlink-subframe heavy configuration, then some uplink HARQ processes may not continue to proceed due to the lack of number of uplink subframes.

The following rules can be used for uplink HARQ and retransmission timing during an uplink-downlink reconfiguration (a, b) from a current frame n (having configuration a) to the second frame n+1 (having configuration b).

(a) For reconfiguration combinations (0, 1), (1, 0), (1, 6) (6, 1), and (0, 6), the ACK/NACK for uplink data (e.g. PUSCH) sent at subframe 8 in frame n before the configuration change follows the uplink HARQ timing of the configuration after the configuration change in frame n+1.

(b) For reconfiguration combinations (0, 2), (1, 2), (2, 0), (2, 1), (2, 6), and (6, 2), the ACK/NACK for uplink data sent at subframe 7 in frame n before the configuration change follows the uplink HARQ timing of the configuration after the configuration change in frame n+1.

(c) For reconfiguration combinations (3,1) and (3,2), the ACK/NACK for uplink data sent at subframe 4 in frame n before the configuration change is sent at subframes 1 and 3, respectively, in frame n+1.

(d) For reconfiguration combination (0,6), subframe 0 in frame n+1 conveys the ACK/NACKs for both uplink data sent at subframes 3 and 4 in frame n before the configuration change, and retransmissions of uplink data occurs at subframes 4 and 7 of frame n+1, respectively, in response to corresponding NACKs.

Figure 12:
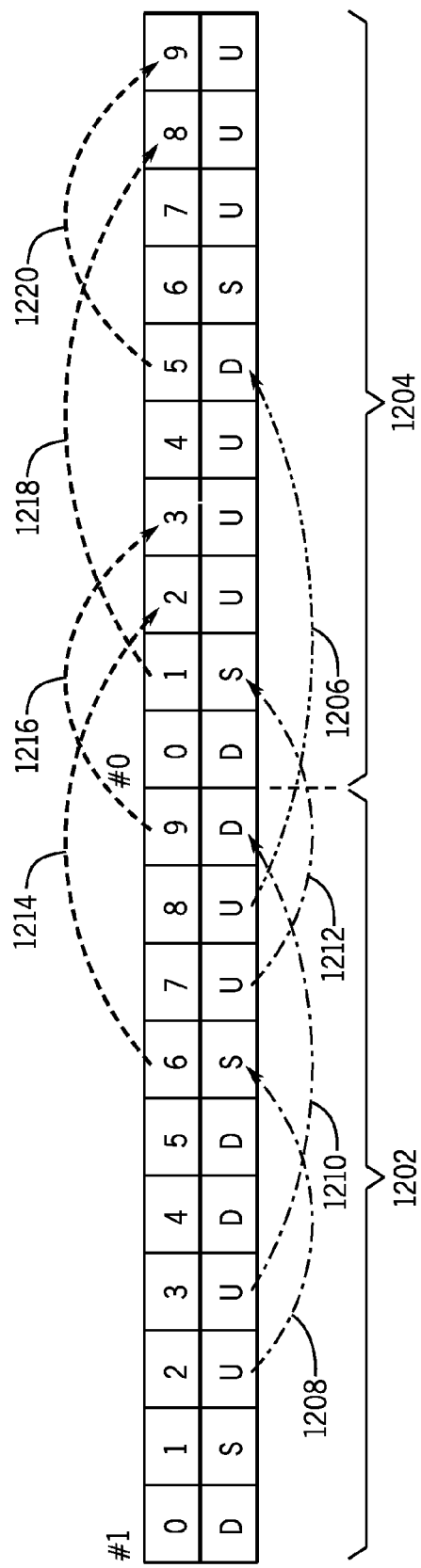
FIGS. 12-16 are schematic diagrams depicting timing relationships for the transmission of an acknowledgement indication and for data retransmission for uplink data in the presence of a configuration change between uplink-downlink configurations, according to further implementations.

An example of rule (a) is illustrated in FIG. 12. During the reconfiguration, uplink-downlink configuration 1 (for frame 1202) is changed to configuration 0 (for frame 1204). The ACK/NACK for the uplink data at subframe 8 in frame n (1202) is supposed to be transmitted at subframe 4 in the following frame n+1 (1204). However, subframe 4 becomes an uplink subframe in frame n+1 as a result of the configuration change. Arrow 1206 shows a new timing relationship for the ACK/NACK for the uplink data at subframe 8 in frame n: the new timing relationship is according to configuration 0 (for frame n+1), which specifies that subframe 5 of frame n+1 is to be used for communicating the ACK/NACK for the uplink data at subframe 8 in frame n.

Arrows 1208, 1210, and 1212 in FIG. 12 depict timing relationships for ACK/NACKs of uplink data sent in subframes 2,3, and 7 of frame n; these timing relationships are according to configuration 1. Arrows 1214, 1216, 1218, and 1220 depict timing relationships for retransmissions of uplink data following respective NACKs.

Figure 13:
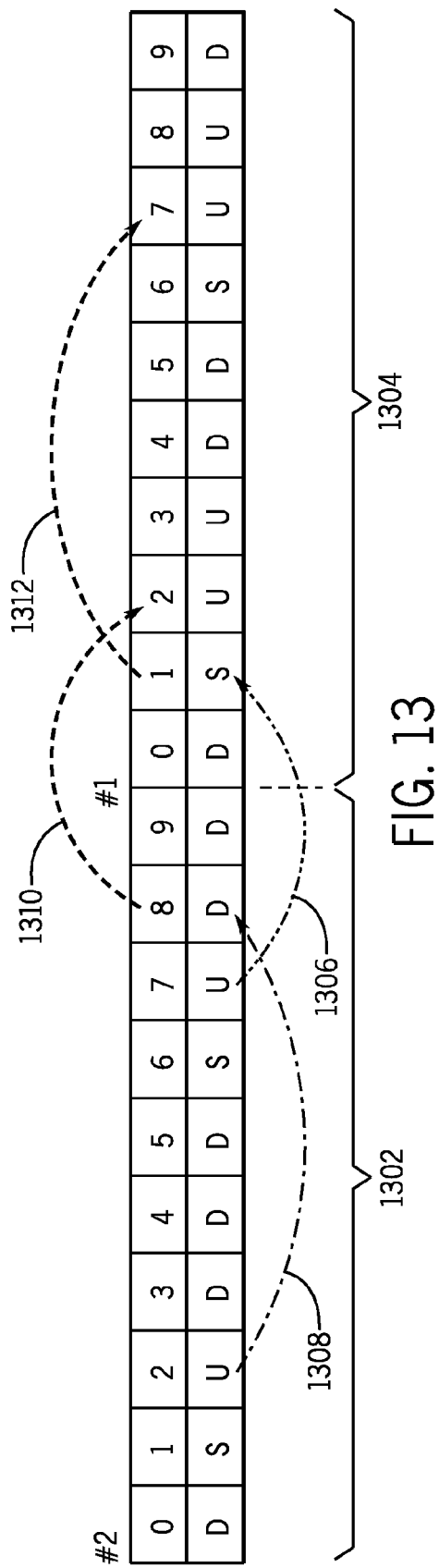

FIG. 13 shows an example of rule (b). During the reconfiguration, uplink-downlink configuration 2 is changed to configuration 1. The ACK/NACK for uplink data sent at subframe 7 in frame n (1302) is supposed to be transmitted at subframe 3 in frame n+1 (1304). It is not possible since subframe 3 in frame n+1 has become an uplink subframe as a result of the configuration change. Arrow 1306 shows a new timing relationship for the uplink data sent at subframe 7 in frame n: the new timing relationship is according to configuration 1 (for frame n+1), which specifies that subframe 1 of frame n+1 is to be used for communicating the ACK/NACK for the uplink data at subframe 7 in frame n.

Arrow 1308 shows a timing relationship between uplink data sent at subframe 2 in frame n and the corresponding ACK/NACK. Arrows 1310 and 1312 depict timing relationships for retransmissions of uplink data following respective NACKs.

Figure 14:
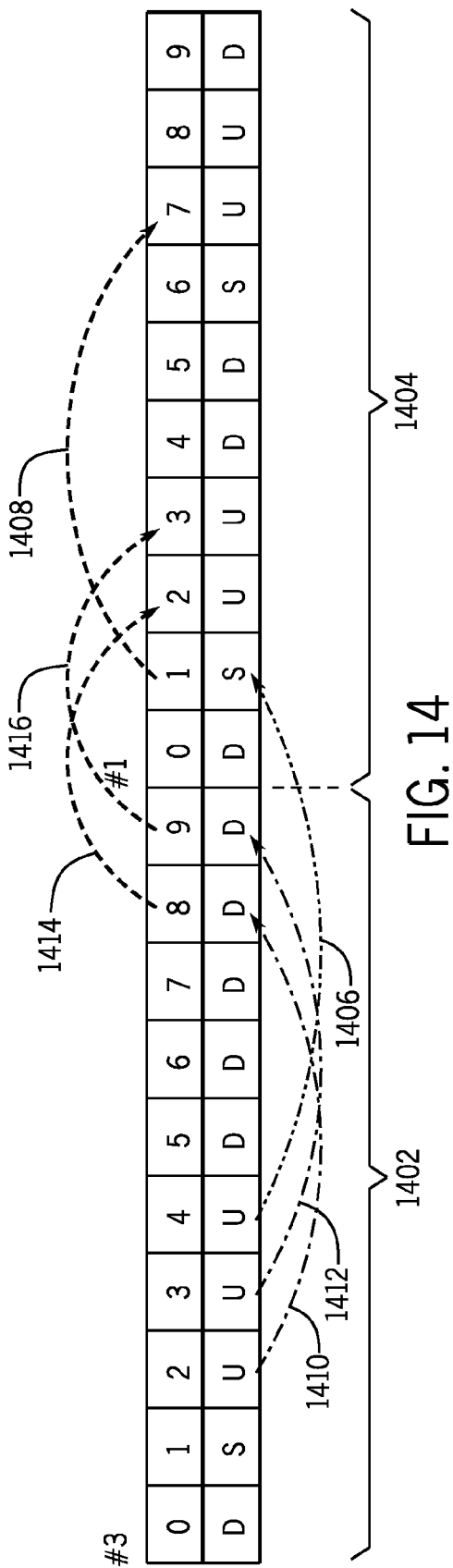

An example of rule (c) is shown in FIG. 14. In this example, uplink-downlink configuration 3 is changed to configuration 1. Based on uplink HARQ timing of uplink-downlink configuration 3, the ACK/NACK for subframe 4 in frame n (1402) should be sent at subframe 0 of frame n+1. However, due to the configuration change, there is no PHICH resource (more generally, no HARQ resource) configured in subframe 0 in frame n+1 according to configuration 1. So the new timing relationship is represented by arrow 1406, which specifies that subframe 1 in frame n+1 is to communicate the ACK/NACK for the uplink data in subframe 4 in frame n. If a NACK is sent in subframe 1 in frame n+1, then retransmission of the uplink data can occur in subframe 7 in frame n+1 (arrow

1408), which is according to the existing retransmission timing linkage for configuration 1.

Arrows 1410 and 1412 in FIG. 14 depict timing relationships for ACK/NACKs of uplink data sent in subframes 2 and 3 of frame n; these timing relationships are according to configuration 3. Arrows 1416 and 1418 depict timing relationships for retransmissions of uplink data following respective NACKs.

In rules (a)-(c), the uplink data transmission occurs in frame n, which is before the configuration change, and the ACK/NACK occurs in the following frame n+1. As a result, the uplink-downlink configuration of the following frame n+1 does not have to be known in advance. The location of the acknowledgement subframe can be determined later but before the frame boundary, as soon as the reconfiguration information becomes available.

Figure 15:
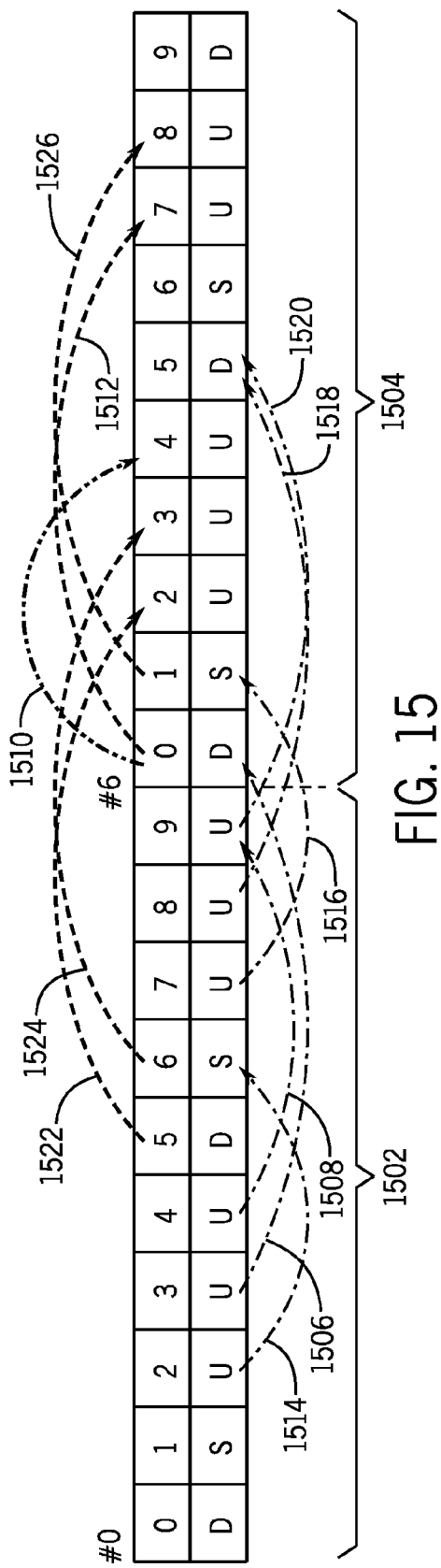

FIG. 15 illustrates rule (d), which addresses reconfiguration from configuration 0 to configuration 6. Due to a smaller number of downlink subframes with configuration 0, some of the downlink subframes are responsible for communicating multiple ACK/NACKs and retransmissions. Following the uplink HARQ timing of configuration 0, ACK/NACK bits for both subframes 3 and 4 in frame n (1502) are conveyed at subframe 0 of frame n+1 (arrows 1506 and 1508, respectively, in FIG. 15). However, based on the uplink HARQ timing of configuration 6, there is only one retransmission linkage from subframe 0 in frame n+1 to the subframe where the retransmission is to occur. The PHICH resource provisioned at subframe 0 of frame n+1 (according to configuration 6) is only for one uplink subframe PUSCH.

One solution is to provision the PHICH resource at the UE (discussed further below). Another solution is to combine the ACK/NACKs on the PHICH at subframe 0 for both subframes 4 and 7 in frame n+1. For example, if the wireless access network node does not request any retransmissions (which means that the wireless access network node has successfully received subframes 3 and 4 in frame n), then the wireless access network node sends an ACK at subframe 0 in frame n+1, and non-adaptive retransmissions do not occur at subframes 4 and 7. If the wireless access network node wants a retransmission at subframe 4 and/or subframe 7 in frame n+1, then the wireless access network node sends a NACK at subframe 0 in frame n+1. This NACK triggers non-adaptive retransmissions at both subframes 4 and 7 in frame n+1 (arrows 1510 and 1512, respectively).

Arrows 1514, 1516, 1518, and 1520 specify other timing relationships from corresponding uplink transmissions to respective ACK/NACKs. Arrows 1522, 1524, and 1526 specify other timing relationships between NACKs and respective retransmissions.

Figure 16:
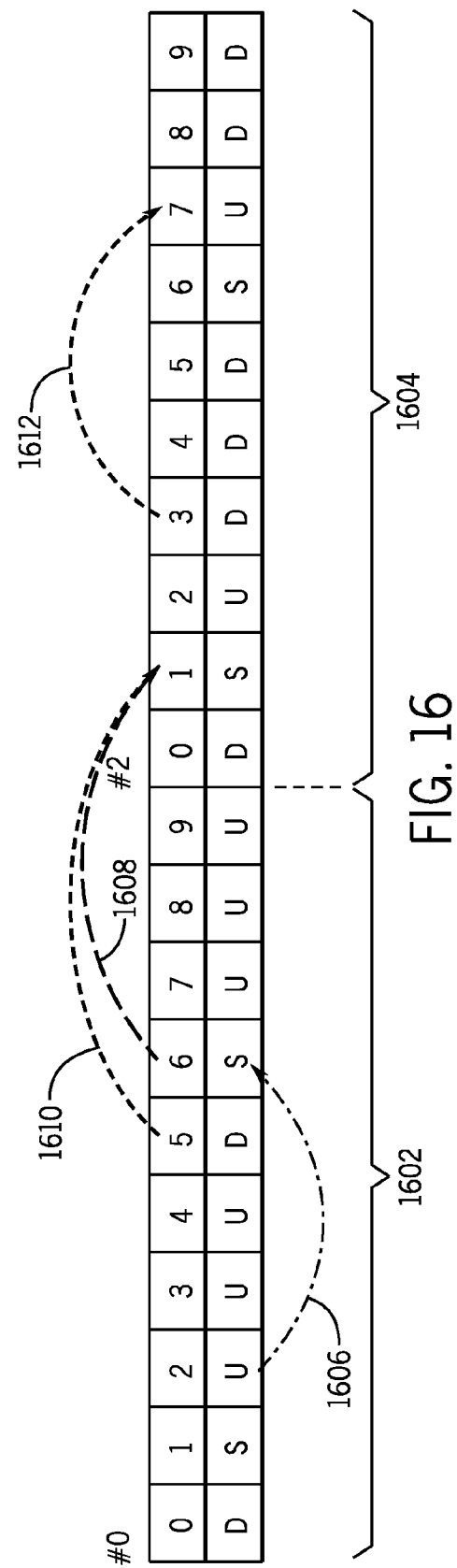

FIG. 16 illustrates the case of reconfiguration from configuration 0 to 2. If the wireless access network node does not receive uplink data at subframe 2 in frame n (1602) correctly, the wireless access network node sends a NACK at subframe 6 in frame n (arrow 1606). In addition, the scheduler in the wireless access network node can purposely not grant the resource for the next subframe 2 in frame n+1 (1604), and leave the resource for the retransmission from the NACK at subframe 6 in frame n (arrow 1608).

Reconfiguration combination (0,5) can follow a similar operation as reconfiguration combination (0,2) discussed above.

In each of the reconfiguration combinations (0,3), (6,3), subframes 3 and 4 in frame n both use subframe 4 in frame n+1 to send the retransmission if requested. As a result, the scheduler in the wireless access network node has to consider this to avoid possible conflict.

The following describes solutions in the context of lack of PHICH resource, missing retransmission timing linkage, or lack of downlink subframe availability for ACK/NACK. In response to detecting the foregoing, one of the following actions can be performed to enable the sending of an acknowledgment indication or an uplink retransmission.

In some examples, adaptive uplink retransmission can be performed. In some reconfiguration scenarios, the wireless access network node has no PHICH resource to convey an ACK/NACK. The wireless access network node sends an uplink grant instead with new data indicator (NDI) not toggled (which means that the uplink grant is requesting the retransmission of previously sent uplink data). In response to this uplink grant, the UE transmits the transport data in the retransmission buffer. This technique involves the reuse of the existing DCI format 0/4 or the use of an HARQ process ID in the uplink grant to make timing linkage more flexible.

In other examples, new PHICH resources can be created. There are several possible schemes that can be used to provision PHICH resource in a control region. One way is to puncture the new UE PHICH resource onto the existing control region. Another way is to use a special PDCCH with a special RNTI. The previous PHICH process may be maintained inside the special PDCCH. The third way is to treat ACK/NACK bits as DCI payload. Using a special Radio Network Temporary identifier (RNTI), channel coding, rate matching, and Quadrature Phase Shift Keying (QPSK) modulation, a channel coding rate may be semi-statically adjustable to obtain an improved performance and capacity tradeoff.

The above proposed scheme for provisioning PHICH resource in the control region may extend to PDSCH resource region, e.g. enhanced PDCCH (EPDCCH) region.

As alternative examples, a new timing linkage can be created. This technique creates a new timing linkage to the nearest downlink subframe that has PHICH capability and is located 4 ms after the initial PUSCH transmission. The ACK/NACK bit may be bundled with an existing ACK/NACK bit. For retransmission, the new timing linkage may be created to the nearest uplink subframe which is located 4 ms after the subframe conveying the NACK.

Alternatively, no action is performed. There will be no ACK/NACK sent if there is no normal PHICH link. There will be no retransmission sent if there is no retransmission link. The wireless access network node can terminate the HARQ process and allow an upper protocol layer (e.g. RLC layer) to handle the resulting packet error.

Number of Uplink HARQ Processes

The number of uplink HARQ processes also changes as the TDD uplink-downlink configuration changes. For uplink HARQ process, it is more difficult to handle the transition since it is a synchronous process and the uplink grant does not contain the HARQ index number. However, the uplink grant has a bit used as a new data indicator. Similar to downlink case, when the number of HARQ processes changes to a larger or the same number after reconfiguration, the current m uplink HARQ buffer(s) can directly transfer to the first m HARQ buffer(s) of the uplink HARQ processes after reconfiguration. Both the wireless access network node and UE should know the mapping of HARQ number to subframe number. When the number of HARQ processes changes to a smaller number due to reconfiguration, the proposed schemes to handle the situation are as follows:

1. The uplink HARQ buffer fills up all available uplink HARQ processes and temporarily stores the remaining uplink HARQ buffers in the same order in a queue at both the UE and the wireless access network node. The remaining HARQ processes are allowed to finish one by one as soon as there is an opportunity. For example, whenever a current HARQ completes, the wireless access network node can send an uplink grant with a negative new data indicator to the UE. The UE receives the grant with negative new data indicator, and knows to restart the first HARQ process in the queue.
2. The wireless access network node indicates a conservative MCS to the UE to send PUSCH to make sure that the wireless access network node will receive the PUSCH correctly, and be able to complete the HARQ transmission before the uplink-downlink configuration change in order to make the number of HARQ processes equal to the specified number after the change.
3. The wireless access network node may control the number of uplink HARQ processes to the specified number after the change by purposely not granting new data using new uplink HARQ process.
4. The wireless access network node may terminate the excessive number of uplink HARQ processes. The resulting packet error is passed to an upper layer for handling.

In specific examples, the uplink HARQ ACK/NACK timing linkage is provided in Table 8.3-1 of 3GPP TS 36.213, which is reproduced as Table 4 below. Table 4 indicates that the PHICH ACK/NACK received in downlink subframe i is linked with the uplink data transmission in uplink subframe i−k, with k is given in Table 4. In addition, for uplink-downlink configuration 0, in subframes 0 and 5, when $I_{PHICH}=1$, k=6. This is because there may be two ACK/NACKs for a UE transmitted on the PHICH in subframes 0 and 5, one is represented by $I_{PHICH}=1$, the other is $I_{PHICH}=0$.

TABLE 4

| Uplink-downlink Configuration | k for HARQ ACK/NACK subframe number i | | | | | | | | | |
|---|---|---|---|---|---|---|---|---|---|---|
| | 0 | 1 | 2 | 3 | 4 | 5 | 6 | 7 | 8 | 9 |
| 0 | 7 | 4 | | | | 7 | 4 | | | |
| 1 | | 4 | | | 6 | | 4 | | | 6 |
| 2 | | | 6 | | | | 6 | | | |
| 3 | 6 | | | | | | | 6 | 6 | |
| 4 | | | | | | | | 6 | 6 | |
| 5 | | | | | | | | 6 | | |
| 6 | 6 | 4 | | | | 7 | 4 | | | 6 |

System Architecture

Figure 17:
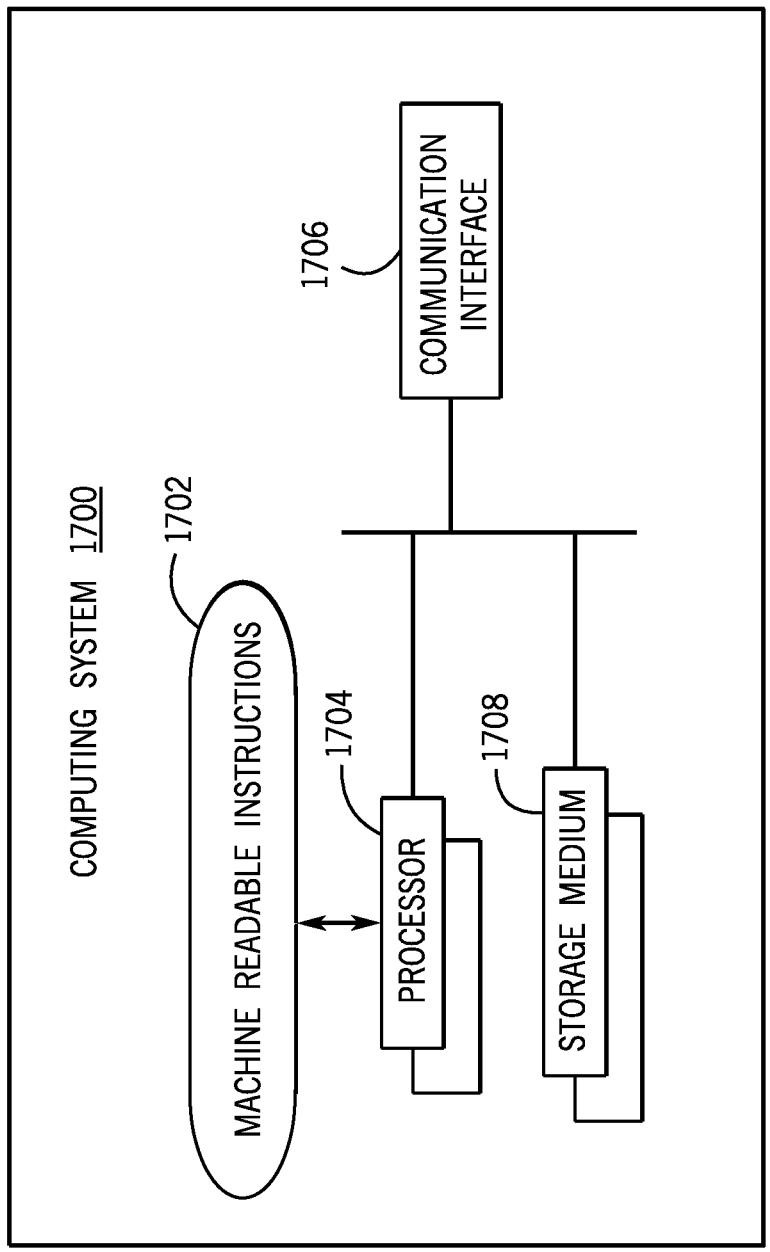
FIG. 17 is a block diagram of the example system according to some implementations.

FIG. 17 depicts a computing system 1700, which can be any of the UE or wireless access network node (e.g. eNB according to LTE) discussed above. The computing system 1700 includes machine-readable instructions 1702, which are executable on a processor (or multiple processors) 1704 to perform various tasks discussed above. A processor can include a microprocessor, microcontroller, processor module or subsystem, programmable integrated circuit, programmable gate array, or another control or computing device.

The processor(s) 1704 can be coupled to a communication interface or component 1706 to perform communications. For example, the communication component 1706 can perform wireless communication over an air interface, or perform wired communication over a wired connection. In some cases, the computing system 1700 can include multiple communication components 1706 to communicate with respective different network nodes.

The processor(s) 1704 can also be coupled to a computer-readable or machine-readable storage medium (or storage media) 1708, for storing data and instructions. The storage medium or storage media 1708 can include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method of a user equipment (UE), comprising:
   receiving downlink data wirelessly from a network node in a first frame according to a first uplink-downlink configuration assigned for communications between the UE and the network node in a cell;
   determining a reference uplink-downlink configuration in response to a configuration change that causes a change of an uplink-downlink configuration assigned for communications between the UE and the network node in the cell from the first uplink-downlink configuration to a second, different uplink-downlink configuration, wherein the configuration change causes a second frame following the first frame to be according to the second uplink-downlink configuration, and wherein determining the reference uplink-downlink configuration includes:
      identifying a set of downlink subframed that is a union of a set of downlink subframes in the first frame and a set of downlink subframes in the second frame, and
      selecting the reference uplink-downlink configuration that includes the identified set of downlink subframes; and
   sending, in the second frame, an acknowledgement indication for the downlink data according to a timing of the reference uplink-downlink configuration.

2. The method of claim 1, wherein the reference uplink-downlink configuration is selected from among a plurality of uplink-downlink configurations.

3. The method of claim 2, wherein the plurality of uplink-downlink configurations include an uplink-downlink configuration different from the first and second uplink-downlink configurations.

4. The method of claim 1, wherein the determined reference uplink-downlink configuration is uplink-downlink configuration 5 according to a Long-Term Evolution (LTE) protocol.

5. The method of claim 1, wherein the determined reference uplink-downlink configuration is uplink-downlink configuration 0 according to a Long-Term Evolution (LTE) protocol.

6. The method of claim 1, wherein the second frame immediately follows the first frame in communications between the UE and the network node in the cell.

7. A method of a user equipment (UE), comprising:
receiving downlink data wirelessly from a network node in a first frame according to a first uplink-downlink configuration;
in response to a configuration change that causes a second frame following the first frame to be according to a second, different uplink-downlink configuration, determining a reference uplink-downlink configuration in response to the configuration change;
sending, in the second frame, an acknowledgement indication for the downlink data according to a timing of the reference uplink-downlink configuration:
performing communication using ACK/NACK multiplexing; and
in response to determining that the configuration change is to the second uplink-downlink configuration that does not support ACK/NACK multiplexing, switching from using ACK/NACK multiplexing to using ACK/NACK bundling.

8. The method of claim 7, further comprising:
determining that a number of hybrid automatic repeat request (HARQ) processes supported by the second uplink-downlink configuration is less than a number of HARQ processes supported by the first uplink-downlink configuration; and
in response to the determining, taking action to handle an excess number of HARQ processes after the configuration change.

9. The method of claim 7, further comprising:
modifying a buffer size parameter after the configuration change; and
sending a new data transmission or a data retransmission using the modified buffer size parameter.

10. The method of claim 7, wherein using the ACK/NACK multiplexing comprises separately transmitting ACK/NACK bits in a given subframe of the first frame, wherein the ACK/NACK bits are mapped to the given subframe, and the ACK/NACK bits are responsive to respective downlink data in multiple subframes of a frame preceding the first frame, and
wherein using the ACK/NACK bundling comprises performing a logical AND operation of ACK/NACK bits that are responsive to respective downlink data in multiple subframes of the first frame, and sending an ACK/NACK produced by the logical AND operation in a subframe of the second frame.

11. A network node comprising:
a communication interface to communicate with a user equipment (UE), and
at least one processor configured to:
detect a configuration change from a first uplink-downlink configuration of a first frame to a second uplink-downlink configuration of a second frame that follows the first frame;
in response to the configuration change, determine, based on at least one rule, a timing relationship between an uplink grant and a scheduled subframe of a frame for communicating uplink data, the frame for communicating the uplink data being the first frame or the second frame, the at least one rule specifying that the timing relationship of the uplink grant is determined by an uplink-downlink configuration of a frame carrying the uplink grant, unless the configuration change involves one of an enumerated set of configuration combinations, the frame carrying the uplink grant being the first frame or the second frame, therein each configuration combination of the configuration combinations includes a respective pair of different uplink-downlink configurations used in successive frames, wherein the at least one rule further specifies that responsive to the configuration change involving one of the enumerated set of configuration combinations, the timing relationship of the uplink grant is according to one of plural timing relationships of the uplink grant specified for respective configuration combinations of the set of configuration combinations.

12. The network node of claim 11, wherein the at least one processor is to prevent a configuration change to an uplink-downlink configuration that does not support ACK/NACK multiplexing in response to determining that ACK/NACK multiplexing is configured.

13. The network node of claim 11, wherein the
at least one processor is configured to:
receive uplink data in a third frame according to a third uplink-downlink configuration; and
in response to a second configuration change that causes a fourth frame following the third frame to be according to a fourth uplink-downlink configuration different from the third uplink-downlink configuration, determine, based on at least one rule relating to a combination of the third and fourth uplink-downlink configurations, a timing of an acknowledgement indication in the fourth frame for acknowledging the uplink data.

14. The network node of claim 13, wherein determining the timing of the acknowledgement indication comprises selecting, based on the at least one rule, a downlink subframe to send the acknowledgement indication in the fourth frame.

15. The network node of claim 13, wherein the at least one processor is configured to further:
in response to determining that the second configuration change is from a specified set of configuration changes, cause the timing of the acknowledgement indication in the fourth frame to follow the fourth uplink-downlink configuration.

16. The network node of claim 13, wherein the at least one processor is configured to further:
in response to determining that the second configuration change is from a specified set of configuration changes, cause the acknowledgement indication to be communicated in a specified subframe in the fourth frame.

17. The network node of claim 13, wherein the at least one processor is configured to further:
in response to determining that the second configuration change is a specified configuration change, cause the acknowledgement indication and another acknowledgement indication for another uplink data to be communicated in a specified subframe in the fourth frame.

18. The network node of claim 17, wherein the at least one processor is configured to further:

in response to determining that the second configuration change is from a specified set of configuration changes, cause retransmission of uplink data in a specified subframe in the fourth frame.

19. The network node of claim 13, wherein the at least one processor is configured to further:
in response to determining lack of a physical hybrid automatic repeat request (PHICH) HARQ resource, missing retransmission timing linkage, or lack of a downlink subframe for an acknowledgement indication or an uplink retransmission in the fourth frame, perform an action to enable the sending of an acknowledgment indication or an uplink retransmission.

20. The network node of claim 19, wherein the action is at least one selected from among:
sending an uplink grant with a new data indicator untoggled to the UE;
using a PHICH resource provided in a control region; and
creating an additional timing relationship for an acknowledgment indication or uplink retransmission.

21. The network node of claim 13, wherein the at least one processor is configured to further:
determine that a number of hybrid automatic repeat request (HARQ) processes supported by the fourth uplink-downlink configuration is less than a number of HARQ processes supported by the third uplink-downlink configuration; and
in response to the determining, taking action to handle an excess number of HARQ processes after the second configuration change.

22. The network node of claim 11, wherein the enumerated set of configuration combinations includes at least one configuration combination where the first uplink-downlink configuration is configuration 2 or 5 according to a Long-Term Evolution (LTE) protocol.

23. The network node of claim 11, wherein the enumerated set of configuration combinations includes at least one configuration combination where the second uplink-downlink configuration is configuration 6 according to a Long-Term Evolution (LTE) protocol.

* * * * *